Feb. 12, 1957 J. F. KOPCZYNSKI 2,780,825
ATTACHMENT FOR WINDSHIELDS
Filed Feb. 9, 1955
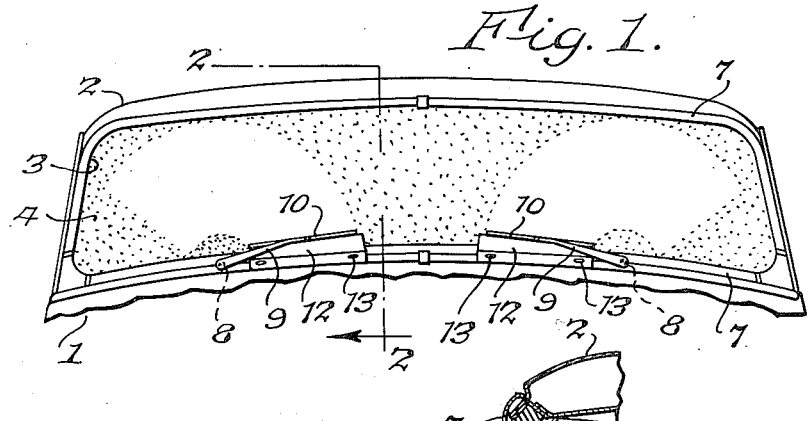
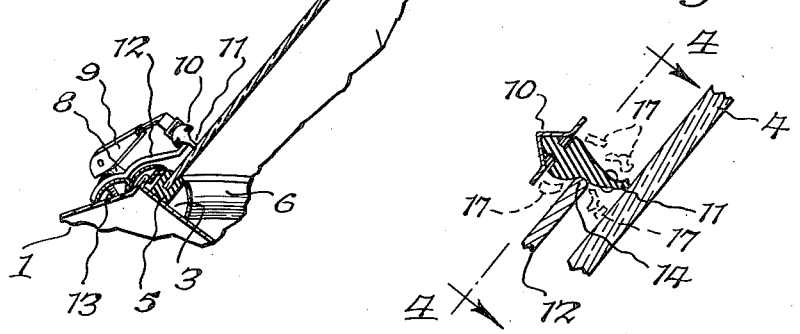
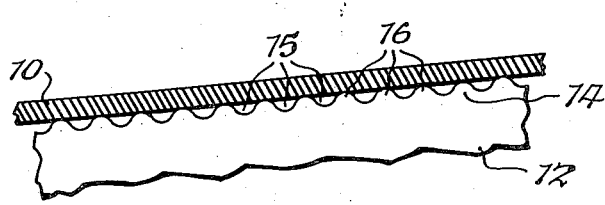
INVENTOR.
John Kopczynski

United States Patent Office 2,780,825
Patented Feb. 12, 1957

2,780,825

ATTACHMENT FOR WINDSHIELDS

John F. Kopczynski, Buffalo, N. Y.

Application February 9, 1955, Serial No. 487,159

8 Claims. (Cl. 15—255)

This invention relates to transparent panels and the like from a face of which one may desire to remove rain, ice and snow that may collect thereon. It is common to effect such removal with a flexible wiper blade that is oscillated back and forth over the face of the panel, with a flexible edge of the blade in contact with and wiping said panel face. Snow and ice being wiped from the panel face often adhere to and accumulate on the blade in increasing amounts and at times interfere with the wiping action of the blade on the panel.

An object of this invention is to provide an improved windshield wiping device with which snow and ice accumulating on the flexible or wiping part of the wiping blade may be easily loosened and dislodged without it being necessary for a vehicle operator to leave the driver's seat, and which will be relatively simple, practical and inexpensive.

Another object is to provide a simple and inexpensive attachment for the windshields of motor vehicles which may be easily attached to existing windshields and which, when so attached, may be made effective to loosen and dislodge snow and ice from the wiping edge of the wiper blade.

Other objects and advantages will be apparent from the following description of an embodiment of the invention, and the novel features will be particularly pointed out hereinafter in connection with the appended claims.

In the accompanying drawings:

Fig. 1 is a front elevation of an automobile windshield and wiper with this invention applied thereto;

Fig. 2 is a sectional elevation of the same, the section being taken approximately along the line 2—2, Fig. 1;

Fig. 3 is a sectional elevation similar to Fig. 2, but with the section taken through a wiper blade;

Fig. 4 is another sectional view of the same, the section being taken approximately along the line 4—4, Fig. 3.

In the illustrated embodiment of the invention, an automobile body 1 having a top 2 is provided with an opening 3 which is closed by a transparent or glass panel or windshield 4 that is confined in the opening 3. The margin of the panel is received in a groove in a gasket 5, and the gasket is confined against a molding or flange 6 by another molding or flange 7. This is a typical vehical construction by which the glass panel is confined in the vehicle body or support.

Mounted in the body, just below the opening 3, are two windshield wiper shafts 8, Fig. 2, that extend to the exterior of the body, and there each detachably mounts a wiper arm 9 that extends over the panel 4. The shafts 8 are usually coupled for operation together, but not necessarily so, and one or both are driven by a suitable motor (electric or vacuum), not shown, but usual in automobiles. The wiper arms 9 oscillate back and forth over the panel and each carries at its free ends a wiper blade or member 10 which has a flexible part extending towards the panel and tapering or converging in cross section to a relatively thin wiping edge 11, Fig. 3. The flexible parts of these blades 10 are usually of soft, flexible rubber or rubber substitutes. Such wiper motors, arms and blades come as regular equipment on automobiles as standard equipment.

My improved attachment comprises a plate or member 12 of sheet material having one side portion formed to fit over the molding 7 that confines the panel 4 in position in the body, or to any other part of the body 1 along the lower margin of the panel. There is one of these members or plates 12 for each wiper arm, and they are secured to the molding 7 or other part of the body in any suitable manner, such as by screws 13, Fig. 2. Each member or plate 12 has a free portion extending over and in slightly spaced relation to the lower marginal part of the panel 4 where its free edge 14 can be struck broadside, along approximately its full length, by the side of the flexible part of the wiper blade 10, Fig. 3, that is adjacent thereto when the blade closely approaches its lower limit of oscillation, as shown in Fig. 1. The impact of the flexible part of the wiper blade against the edge 14 of the member or plate 12 flexes the wiping edge of the blade 10 and, in so doing, will loosen ice or snow adhering to the wiping edge of the blade so that it is dislodged from the blade at once or in the following oscillations of the blade.

To increase the effectiveness of the impact on the flexible part of the upper blade, the edge 14 of member 12 that is engaged by the wiper blade is made serrated, such as by providing notches 15 in the edge 14, spaced apart along that edge to provide a row of spaced humps 16 which are engaged by the wiper blade. The serrated edge abuts against the side of the wiper blade along approximately the full lengths of both edge 14 and blade 10 at about or just before the normal limit of oscillation of blade 10 towards the lower margin of the panel.

In the typical windshield wiper as used on present day automobiles, when one shuts off the operating motor, the blade automatically returns to an idle position along the lower edge of the transparent panel, as shown in Fig. 1, but when the wiper is oscillating, its lower limit of travel is just short of this idle position. Preferably the member 12 is disposed to be engaged by the wiper blade just before the blade reaches idle position, or when the blade moves closely to idle position, but just out of contact range of the blade 10 while the blade is oscillating. The reversal of travel of the blade is obtained by its travel to a selected extent in each direction, which is short of its idle position, and with this positioning of the member 12, there is no interference with the automatic reversal of travel of the blade.

When one desires to dislodge snow or ice from the blade, one merely shuts off the operating motor of the wiper momentarily, and when that is done the motor returns the blade automatically and with considerable force toward its idle position against the edge 14 of member 12. The impact of the flexible part of the wiper blade with edge 14 will dislodge or loosen snow and ice adhering to the wiping edge or margin of the blade, so that it at once falls off or will soon do so as oscillation of the blade is resumed. The dotted lines 17 in Fig. 3 illustrate particles of ice and snow just dislodged from the blade 10 by the impact of the blade against the serrated edge 14 of the member 12.

It will be understood that various changes in the details, materials and arrangements of parts, which have been herein described and illustrated in order to explain the nature of the invention, may be made by those skilled in the art within the principle and scope of the invention as expressed in the appended claims.

I claim:

1. An attachment for windshields of the type having a transparent panel mounted in a frame and having a wiper of the type having a flexible wiper blade movable back and forth by power across and in contact with a portion of the panel, with a flexible, free side edge portion of the wiper blade in contact along a side edge thereof, with the outer face of said panel to wipe water and snow from the panel, said attachment comprising a member formed for attachment to the outside of said frame along a margin of the panel, with an edge thereof projecting slightly over the panel but in spaced relation thereto, at one end of, and in the path of travel of said flexible, free side edge portion of said blade, and at an angle to be struck broadside, along its length, by the said flexible side edge portion of said blade at one end of its back and forth power stroke, beyond the normal wiping stroke, whereby when the blade strikes said edge broadside with force, at the end of a stroke, the impact will deform the wiper blade and shatter ice carried by the blade and thus dislodge it from the blade.

2. An attachment for windshields of the type having a transparent panel mounted in a frame and having a wiper of the type having a flexible wiper blade movable back and forth by power across and in contact with a portion of the panel with a flexible, free side edge portion of the wiper blade in contact along a side edge thereof, with the outer face of said panel to wipe water and snow from the panel, said attachment comprising a member formed for attachment to the outside of said frame along a margin of the panel, with an edge thereof projecting slightly over the panel but in spaced relation thereto, in the path of travel of the said free edge portion of the wiper blade, and at an angle to be struck broadside, along its length, by the flexible side edge portion of said blade at one end of its back and forth movement, beyond the normal wiping stroke, whereby when the wiper blade strikes said edge with force at the end of a movement, the impact will deform said flexible edge portion of the blade and shatter any ice carried by the blade and thus dislodge it from the blade, said edge of said member which is struck by said blade being serrated to make approximately point contact with the blade at many points along the length of the blade and increase the shattering impact on any ice on the faces of the blade.

3. An attachment for windshields and the like of the type having a transparent panel, a support for the panel, and a windshield wiper of the type having a wiper blade that is moved by power back and forth across and has a free, flexible side wiping edge portion in contact with a face of the panel, but when made inactive is returned by power to a position along a margin of the panel, which attachment comprises a plate formed for attachment to said panel support with one edge thereof extending slightly across said panel, in slightly spaced relation thereto, and parallel to, and in the path of and engaged by the flexible, free side wiping edge portion of the wiper blade just before said blade reaches its said inactive position beyond the normal wiping path of the blade, whereby when one desires to dislodge accumulated snow and ice from the blade, the blade is made inactive and strikes broadside against the edge of the plate with an impact which deforms the free, side edge portion of the wiper blade and loosens said ice and snow.

4. An attachment for windshields and the like of the type having a transparent panel, a support for the panel, and a windshield wiper with a wiper blade that moves back and forth across and has a free, flexible side wiping edge portion in contact with a face of the panel, but when made inactive is returned by power to a position along a margin of the panel, which attachment comprises a plate formed for attachment to said panel support with one edge thereof extending slight across said panel, in slightly spaced relation thereto, and parallel to, and in the path of and engaged by the flexible, free side wiping edge portion of the wiper blade just before said blade reaches its said inactive position beyond the normal wiping path of the blade, said one edge of said plate which is engaged by said blade having notches therein providing a row of spaced humps that may engage said blade over approximately the full length of the blade, whereby when one desires to dislodge accumulated snow and ice from the blade, the blade is made inactive and strikes broadside against the edge of the plate with an impact which loosens said ice and snow.

5. An attachment for windshields and wipers therefor of the type having a transparent panel, a support with an opening in which said panel is mounted and which is closed by said panel, a wiper arm mounted on the support to move back and forth across a selected area of one face of said panel, and a wiper blade carried by said arm, extending therefrom toward said one face of said panel, and having a laterally flexible, free side edge portion of elastic rubber which engages with and wipes said one panel face, said attachment comprising an impact member formed for attachment to said support along an edge of said panel toward which said blade moves in its back and forth movement with said arm, and having a side edge thereof extending over, and in slightly spaced relation to said panel adjacent a margin thereof towards which the blade moves in approaching one limit of its back and forth movement, and in the path of, and engaged broadside, along its length, by a side of the flexible part of the rubber wiper blade when the wiper blade closely approaches its normal, inactive position at one end of its back and forth movement, but beyond its normal wiping path in its repeated back and forth movements, whereby when a side of the blade strikes broadside against said edge of said member, the blade will be flexed at its free wiping edge to loosen any ice and snow adherent to the free edge of the blade.

6. An attachment for windshields and wipers therefor of the type having a transparent panel, a support with an opening in which said panel is mounted and which is closed by said panel, a wiper arm mounted on the support to move back and forth across a selected area of one face of said panel, and a wiper blade carried by said arm, extending therefrom toward said one face of said panel, and having a laterally flexible, free side edge of rubber which engages with and wipes said one panel face, said attachment comprising an impact member formed for attachment to said support along an edge of said panel toward which said blade moves in its movement with said arm, and having a side edge thereof extending over, and in slightly spaced relation to said panel adjacent a margin thereof towards which the blade moves in approaching one limit of its back and forth movement, and in the path of, and engaged broadside, along its length, by a free side of the flexible rubber part of the wiper blade when the wiper blade closely approaches its normal inactive position at one end of its path of back and forth movement, but beyond its normal wiping path in its repeated back and forth movements, said edge of said member against which the blade engages, being provided with a row of spaced apart notches to form a row of projections that engage the free flexible part of said blade, whereby when a side of the blade strikes broadside against said edge of said member, the blade will be flexed at its free wiping edge to loosen any ice and snow adherent to the free edge of the blade.

7. In a wiper device for windshields of the type having a transparent panel, a support with an opening in which said portion of rubber panel is mounted and which is closed by said panel, a wiper arm mounted on the support to move back and forth across a selected area of one face of said panel, and a wiper blade carried by said arm, extending therefrom toward said one face of said panel and having a laterally flexible, free side edge which engages with and wipes said one panel face, the combination therewith of an impact member attached to said support along an edge of said panel toward which said blade moves in its movement with said arm, and having a side edge thereof extending over and in slightly spaced relation to said panel adjacent a margin thereof toward which the blade moves at one limit of its back and forth movement, and in the path of and engaged broadside, along its length, by a side of the flexible part of the wiper blade when the blade closely approaches its normal, inactive position at one end of its back and forth movement, but beyond its normal wiping path in its repeated back and forth movements, whereby when a side of the wiper blade strikes broadside against said edge of said member, the blade will be flexed at its free, wiping edge to loosen any ice and snow adherent to the free edge of the blade.

8. In a wiper device for windshields of the type having a transparent panel, a support with an opening in which said panel is mounted and which is closed by said panel, a wiper arm mounted on the support to move back and forth across a selected area of one face of said panel, and a wiper blade carried by said arm, extending therefrom toward said one face of said panel and having a laterally flexible, free side edge of resilient material which engages with and wipes said one panel face, the combination therewith of an impact member attached to said support along an edge of said panel toward which said blade moves in its back and forth movement with said arm, and having a serrated, marginal side edge thereof extending over and in slightly spaced relation to said panel adjacent a margin thereof toward which the blade moves at one limit of its back and forth movement, and in the path of and engaged, along its length, with a side of the free, flexible part of the wiper blade when the blade closely approaches its normal, inactive position, but beyond its normal wiping path in its repeated back and forth movements, whereby when a side of the blade strikes broadside against said edge of said member, the blade will be flexed at its free, wiping edge to loosen any ice and snow adherent to the free edge of the blade.

References Cited in the file of this patent

UNITED STATES PATENTS

| | | |
|---|---|---|
| 1,732,417 | Prichard | Oct. 22, 1929 |
| 2,501,013 | Peter | Mar. 21, 1950 |
| 2,583,126 | Smulski | Jan. 22, 1952 |